US011429616B2

(12) United States Patent
Goto (10) Patent No.: US 11,429,616 B2
(45) Date of Patent: Aug. 30, 2022

(54) DATA RECORDING AND ANALYSIS SYSTEM (71) Applicant: Keysight Technologies, Inc., Santa Rosa, CA (US)

(72) Inventor: Masaharu Goto, Hanno (JP)

(73) Assignee: Keysight Technologies, Inc., Santa Rosa, CA (US)

( * ) Notice: Subject to any disclaimer, the term of this patent is extended or adjusted under 35 U.S.C. 154(b) by 691 days.

(21) Appl. No.: 16/373,443

(22) Filed: Apr. 2, 2019

(65) Prior Publication Data
US 2020/0320084 A1 Oct. 8, 2020

(51) Int. Cl.
*G06F 16/2455* (2019.01)
*G06F 16/28* (2019.01)
*G06F 5/06* (2006.01)

(52) U.S. Cl.
CPC .......... *G06F 16/24568* (2019.01); *G06F 5/06* (2013.01); *G06F 16/285* (2019.01)

(58) Field of Classification Search
CPC ..... G06F 16/24568; G06F 16/285; G06F 5/06
See application file for complete search history.

(56) References Cited

U.S. PATENT DOCUMENTS

| | | | | | |
|---|---|---|---|---|---|
| 5,848,239 A | * | 12/1998 | Ando | ................... | G11B 27/105 709/203 |
| 6,047,298 A | * | 4/2000 | Morishita | ........... | H03M 7/3084 341/106 |
| 8,219,574 B2 | * | 7/2012 | Liu | ................... | G06F 16/24568 707/759 |
| 8,595,233 B2 | | 11/2013 | Kawamura | | |
| 2003/0046018 A1 | * | 3/2003 | Kohlmorgen | ........ | G06K 9/6232 702/127 |
| 2012/0124037 A1 | | 5/2012 | Lee | | |
| 2013/0003993 A1 | * | 1/2013 | Michalski | ............. | G06F 3/0482 381/119 |
| 2015/0100534 A1 | | 4/2015 | Ohtani | | |

(Continued)

FOREIGN PATENT DOCUMENTS

JP    2016050830 A    4/2016

OTHER PUBLICATIONS

Marcum, B.R., Using the Data Logger with the Analog Discovery2, https://www.instructables.com/.

(Continued)

*Primary Examiner* — Robert W Beausoliel, Jr.
*Assistant Examiner* — Susan F Rayyan (57) ABSTRACT

A system for recording and analyzing a data stream, a method for analyzing a data stream, and a computer readable memory that stores instructions that cause a computer to execute a method of analyzing a data stream are disclosed. The system includes an input port, output port, buffer, and controller. The controller identifies a segment, referred to as a new extracted data segment (EDS) of the data stream stored in a buffer, the new EDS satisfying an extraction protocol. The controller compares the new EDS to each of a plurality of reference data segments (RDSs) using a similarity protocol. A new RDS is created if the new EDS is not similar to an existing EDS. If the new EDS is similar to an RDS, the RDS is updated to list that new EDS as being similar.

20 Claims, 2 Drawing Sheets

(56) References Cited

U.S. PATENT DOCUMENTS

| | | | |
|---|---|---|---|
| 2016/0110442 A1* | 4/2016 | Williams | G06F 16/9038 |
| | | | 707/737 |
| 2016/0335163 A1* | 11/2016 | Teodorescu | G06F 16/2282 |
| 2017/0060114 A1 | 3/2017 | Barford | |
| 2017/0075990 A1* | 3/2017 | Leu | G06F 16/9535 |
| 2017/0212894 A1* | 7/2017 | Feng | G06F 16/29 |
| 2018/0300372 A1* | 10/2018 | Narayanan | G06F 16/2477 |
| 2020/0081905 A1* | 3/2020 | Zhou | G06F 16/2477 |
| 2020/0258632 A1* | 8/2020 | Soni | G16H 50/20 |
| 2021/0004639 A1* | 1/2021 | Kobayashi | G06F 3/0482 |

OTHER PUBLICATIONS

Yokogawa, PC-BasedMX100, https://yokogawa.com/.
Diligent, WaveForms (Previously WaveForms 2015), https://store.digilentinc.com/.
Wikipedia, Cluster Analysis, https://en.wiipedia.org/.
Wikipedia, Euclidean Distance, https://en.wikipedia.org/.
Mann, Survey Paper on Clustering Techniques, International Journal of Science, Engineering and Technology Research, vol. 2, Issue 4, Apr. 2013, pp. 803-806.
Balcan, Robust Hierarchical Clustering, Journal of Machine Learning Research 15, Dec. 2014, pp. 4011-4051.
Fisher, Knowledge Acquisition via Incremental Conceptual Clustering, Machine Learning 2, Netherlands, 1987, pp. 139-172.
Fisher, Improving Inference Through Conceptual Clustering, AAAI-87 Proceedings, Irvine, California, 1987, pp. 461-465.
Christopher M. Bishop, "Pattern Recognition and Machine Learning", Information Science and Statistics, 2006, pp. 1-758.

\* cited by examiner

DATA RECORDING AND ANALYSIS SYSTEM

BACKGROUND

Data recording systems are now capable of recording quantities of data that are so large that the time to search the recorded data by reading in the stored data serially becomes significant. Data sets in excess of a terabyte are routinely recorded. The time to read a terabyte's worth of data from a conventional disk drive is several hours. Hence, searching the recorded data for a pattern of interest quickly presents challenges.

SUMMARY

The present invention includes a system for recording and analyzing a data stream, a method for analyzing a data stream, and a computer readable memory that stores instructions that cause a computer to execute a method of analyzing a data stream. The system includes an input port, output port, buffer, and controller. The input port is adapted for receiving the data stream, the data stream includes an ordered sequence of data values. The output port is adapted for communicating the data stream to a mass storage device. The buffer is connected to the input port for temporarily storing a predetermined portion of the data stream as the data stream is received by the system. The controller identifies a segment, referred to as a new extracted data segment (EDS) of the data stream stored in the buffer, the new EDS satisfying an extraction protocol. The controller compares the new EDS to each of a plurality of reference data segments (RDSs) using a first similarity protocol, the controller storing information identifying the new EDS in an RDS database if the first similarity protocol indicates that the new EDS is similar to one of the RDSs. The controller creates a new RDS if the new EDS is not similar to any of the RDSs. Each RDS includes a list of the EDSs that were found to be similar to that RDS and the new EDS that caused the controller to create the new RDS.

In one aspect, the buffer includes a FIFO buffer.

In another aspect, the extraction protocol identifies a data value in the buffer on which the new EDS begins and a data value in the buffer on which the new EDS ends.

In another aspect, the data value on which the new EDS ends is a fixed number of sample values from the data value on which the new EDS began.

In another aspect, the first similarity protocol computes a measure of a distance between two data segments and a similarity threshold, the two data segments is defined as is similar if the distance has a predetermined relationship with the similarity threshold.

In another aspect, the controller combines two of the RDSs in response to user input if the RDSs are similar to one another as determined by a second similarity protocol that is less restrictive than the first similarity protocol.

In another aspect, the controller generates a plurality of new RDSs from an existing RDS by comparing EDSs associated with that RDS with each other using a second similarity protocol that is more restrictive than the first similarity protocol.

In another aspect, the controller generates a compressed data stream by replacing each EDS by a symbol representing the RDS that was found to be similar to that EDS.

In another aspect, the controller replaces each sequence of data values that is not part of an EDS with a count indicating a number of symbols in the sequence.

The present invention also includes a method for operating a data processing system to analyze a data stream includes an ordered sequence of data values for clusters of the signals. The method includes sequentially receiving the data stream and assigning an index to each data value as the data value is received. A portion of the received data stream is stored in a buffer from which a new EDS that satisfies an extraction protocol is extracted from the buffer. The data processing system compares the new EDS to each of a plurality of RDSs using a first similarity protocol, the data processing system storing information identifying the new EDS in an RDS database if the first similarity protocol indicates that the new EDS is similar to one of the RDSs, and the data processing system creating a new RDS if the new EDS is not similar to any of the RDSs.

In another aspect, the extraction protocol identifies a data value in the buffer on which the new EDS begins and a data value in the buffer on which the new EDS ends.

In another aspect, the data value on which the new EDS ends is a fixed number of sample values from the data value on which the new EDS began.

In another aspect, the data processing system computes a measure of a distance between two data segments and a similarity threshold, the two data segments is defined as is similar if the distance has a predetermined relationship with the similarity threshold.

In another aspect, the data processing system combines two of the RDSs in response to user input if the RDSs are similar to one another as determined by a second similarity protocol that is less restrictive than the first similarity protocol.

In another aspect, the data processing system generates a plurality of new RDSs from an existing RDS by comparing EDSs associated with that RDS with each other using a second similarity protocol that is more restrictive than the first similarity protocol.

In another aspect, the data processing system generates a compressed data stream by replacing each EDS by a symbol representing the RDS that was found to be similar to that EDS.

In another aspect, the data processing system replaces each sequence of data values that is not part of an EDS with a count indicating a number of symbols in the sequence.

The computer readable memory contains instructions that cause a data processing system to execute a method to analyze a data stream that includes an ordered sequence of data values for clusters of signals. The method includes sequentially receiving the data stream and assigning an index to each data value as the data value is received and storing a portion of the received data stream in a memory buffer. a new EDS that satisfies an extraction protocol is extracted from the buffer. The new EDS is compared to each of a plurality of RDSs using a first similarity protocol, the data processing system storing information identifying the new EDS in an RDS database if the first similarity protocol indicates that the new EDS is similar to one of the RDSs, and the data processing system creating a new RDS if the new EDS is not similar to any of the RDSs.

In another aspect, the data processing system generates a compressed data stream by replacing each EDS by a symbol representing the RDS that was found to be similar to that EDS.

In another aspect, the data processing system replaces each sequence of data values that is not part of an EDS with a count indicating a number of symbols in the sequence.

DETAILED DESCRIPTION

The manner in which the present invention provides its advantages can be more easily understood with reference to a data logging system in which a signal in an incoming data channel is digitized and stored on a memory device such as a disk drive. The data stream can be viewed as containing signals of interest that are defined by an "extraction algorithm" and the signals between the signals of interest, referred to as Idle signals in the following discussion.

In general, a user of the recorded data needs to be able to understand the various signals in the data and retrieve signals of interest. For the purpose of this discussion, it will be assumed that the user does not have a detailed knowledge of all the signals in the data stream to be recorded. It will be assumed that the number of data stream signals is too large for the user to review one at a time. Hence, the user needs to be able to comprehend important features of signals without looking at the entire data stream. For this purpose, it is effective to define clusters of similar signals. By examining representative members of such clusters, the user can gain a better knowledge of the signals that are recorded and specify the parameters needed to retrieve signals of interest.

The present invention provides a user with tools that allow the user to define clusters in the collection of signals that have been recorded based on a similarity algorithm that computes a similarity measure related to the similarity between two signals. Algorithms for clustering objects based on a similarity measure are known to the art. Unfortunately, the computational workload inherent in applying many of these algorithms is of order N2 or higher. Given that a recorded data stream of several terabytes may have more than several millions of signals, clustering the recorded signals in a period of minutes while the user explores the signals is often not practical.

As will be explained in more detail below, the present invention detects small clusters of signals of interest during the recording process. These small clusters are then combined to provide larger clusters that coincide with the clusters of signals in the input data stream. The clusters are constructed without requiring a predetermined description of the signals that are to be clustered. Ideally, each of these clusters contains a small portion of a single cluster of the underlying signals that are present in the input stream. Each cluster is started from an observed signal in the input stream as discussed below. The size of the cluster is determined by a similarity algorithm that includes a threshold value that determines whether a second signal is to be included in the same cluster as a first signal. The manner in which the clusters are combined or in which a cluster is broken into smaller clusters will be discussed in more detail below.

The present invention examines the digitized data stream to detect segments of data within the data stream that are of interest without requiring a detailed knowledge of the data segments in advance. The data segments are identified in real time as the data stream passes through the data logger on the way to a mass storage device. It is assumed that the data stream primarily consists of individual signals separated by regions that do not include data segments of interest. Data stream segments that satisfy the extraction algorithm will be referred to as extracted data segments (EDSs), and data stream segments that contain a signal that does not satisfy the extraction algorithm will be referred to as idle data segments (IDSs).

Ideally each EDS would contain the data samples corresponding to one signal of interest without any background samples. However, the need to identify the EDS in a short period of time constraints the extraction algorithm. To find the precise signal segment of interest requires significantly more time than detecting the beginning of the signal by an easily detectable event such as a rising or falling edge across a defined threshold level and defining the end of the signal to be a fixed number of samples relative to the beginning of the signal. If two signals were in fact the same, the EDSs for the two signals would still match. Hence, in one aspect of the invention, the extraction algorithm specifies a trigger condition that defines the start of the EDS and the end of the EDS is defined to be a fixed number of input samples relative to the start of the EDS. If this approximation interferes with the final clustering, the EDSs can be retrieved from the long-term storage and a clustering based on a more exact end of the signal can be utilized, as described below.

When an EDS is encountered, the EDS is copied to buffer for further examination and assigned an index value that uniquely identifies the EDS in terms of the location of the EDS in the data stream. A "similarity measure" is also defined for the EDSs by a similarity algorithm. The similarity measure reflects the degree of similarity between any two extracted data segments. The similarity measure allows the system of the present disclosure to group extracted data segments into clusters of EDSs that are similar to one another. In one aspect of the invention, the similarity algorithm includes a threshold value. If the similarity measure has a predetermined relationship with a threshold value, the two EDSs are defined to be similar to one another. For example, the two EDSs could be defined to be similar to one another if the similarity measure is less than the threshold value.

When a new EDS is found, the system determines whether the EDS is part of a cluster that has already been found. If the EDS is part of an existing cluster, the existing cluster is updated to reflect the addition of the new EDS. If the EDS is not sufficiently similar to any of the existing clusters, a new cluster is defined and the EDS is added to that cluster.

Each cluster is represented by a reference data segment (RDS). The extraction and clustering are performed in real time during the recording, and hence, a user can view clusters of EDSs that are present in the data stream without the need to recover the EDSs from the now-stored data stream. During the data recording and initial clustering, only the new EDS identified in the data stream is retained in memory. To facilitate the clustering operation, the RDSs are kept in the system memory. After the recording of the data stream has been completed, the clustered EDSs can be recovered and used for further classification.

Figure 1:
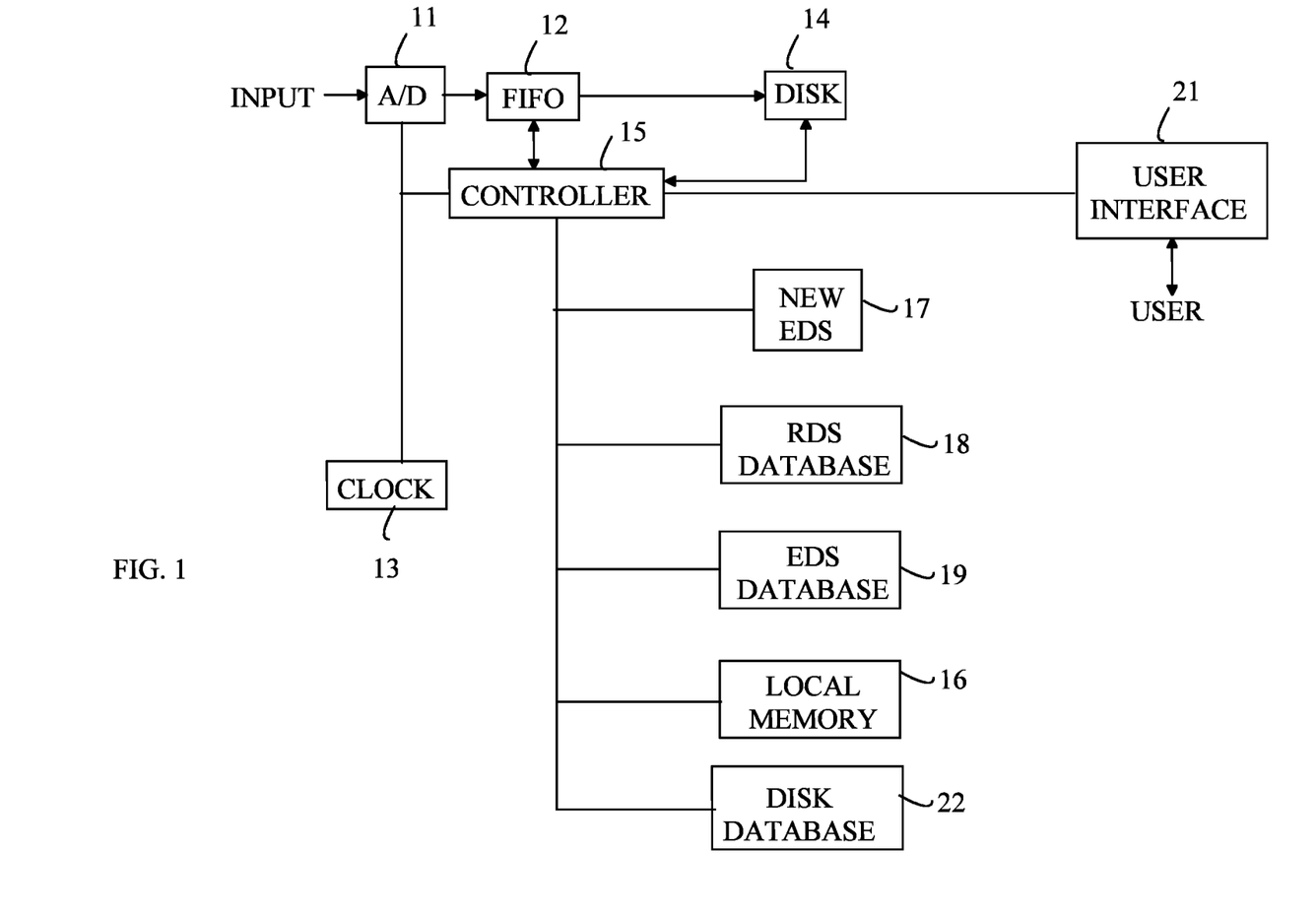
FIG. 1 illustrates a data recording apparatus according to one embodiment of the present invention.

Refer now to FIG. 1, which illustrates a data recording apparatus according to one embodiment of the present invention. An incoming data stream is digitized by analog-to-digital converter (ADC) 11 whose output is stored in a local FIFO buffer 12. It should be noted that FIFO buffer 12 may be implemented in local memory 16. One sample is digitized for each clock cycle from clock 13. Controller 15 maintains an internal register that is incremented at each clock cycle, and provides a unique index for identifying a data segment that begins with the data sample just transferred to FIFO buffer 12. The new data entry is transferred to FIFO buffer 12 and the oldest entry in FIFO buffer 12 is read out on each cycle of Clock 13. On each clock cycle, controller 15 determines if a data segment of interest has begun or is now completed. Controller 15 can include hardware to detect the beginning of a data segment of interest or controller 15 can examine the content of FIFO buffer 12 to determine if a data segment of interest has begun or is now completed. Hardware triggers are used in the oscilloscope arts and known to those skilled in the art. If a data sequence of interest is now within the FIFO buffer 12, controller 15 copies that data sequence from the FIFO buffer to a new EDS buffer 17, notes the location of the new EDS in the data stream and enters that information in an EDS database 19.

To facilitate the retrieval of the EDS from disk 14, a disk database 22 records the correspondence between records on disk 14 and the indices assigned to the beginnings of each EDS. In general, disk 14 is organized as a plurality of disk records that can be randomly accessed. If controller 15 needs to recover an EDS that is stored on disk 14, disk database 22 is used to determine the disk record number at which the index associated with the EDS begins.

If the data sequence of interest has just begun with the previous sample, controller 15 records the sample index at which the data sequence began in an EDS database.

As noted above, there must be a predetermined extraction algorithm that defines a data segment to be extracted. In general, an extraction algorithm defines the beginning and end of a data sequence that is to become an extracted data segment. The controller executing the extraction algorithm must be able to make the identification before the data sequence leaves FIFO buffer 12. The extraction algorithm must operate in real time. Real time trigger algorithms that identify the beginning of a sequence of interest in the input to an oscilloscope are known in the art. The trigger algorithms identify a feature as simple as a rising edge or as complex as a specific signal. In the system of the present disclosure, the extraction algorithm preferably selects a wide range of signals, since the exact nature of the data sequence of interest is not known in advance, and hence, a real time trigger algorithm that identifies a large class of signals is preferred. Note that the start of the data sequence that is to become an extracted data segment need not occur on the sample that triggered the real time trigger. For example, the extracted data segment could start a predetermined number of samples prior to the sample identified by the real time trigger.

The extraction algorithm must also specify the end of the data sequence of interest. In one exemplary embodiment, the extraction algorithm specifies a trigger and a window in the FIFO buffer 12. In this example, the extracted data segment ends at the end of the window and all of the samples within the specified window are part of the EDS even though the signal of interest may terminate prior to the last data value in the window.

In another exemplary embodiment, the extraction algorithm specifies a trigger that signals the end of the data sequence to be extracted. For example, the extraction algorithm could require that data values constituting a falling edge that ends at a value below some threshold value and remains at or below that value for some specified number of samples signals the end of the data segment of interest. Accordingly, the EDS database also includes the length of the EDS or equivalent information such as the index of the last data sample in the EDS.

In one aspect of the invention, information specifying the end of the EDS is also included in EDS database 19.

Once a new EDS is extracted, that EDS is compared to each RDS in a dynamically generated reference library. The RDS library includes an RDS database 18 that stores information about each RDS in the library. If the new EDS is sufficiently similar to one of the RDSs, the new EDS entry in the EDS database is updated to show that connection and the RDS database is updated to show the identification of the new EDS as being part of a cluster associated with that RDS. If the new EDS is not sufficiently similar to one of the RDSs and sufficient processing time remains after comparing the new EDS with all of the RDSs in the RDS database, a new RDS is started using the new EDS as the RDS, and entering the relevant data in the RDS data base. If sufficient processing time is not available, the new EDS entry in the EDS database is marked as having not been assigned. For example, a new EDS may be discovered during the matching of the EDS to the RDSs before all of the RDSs have been considered, and hence, controller 15 has to use the new EDS buffer for this new EDS.

At the beginning of the processing of the data stream, controller 15 receives a similarity measurement algorithm for measuring the similarity between two data segments. In one aspect of the invention, the similarity algorithms generate a similarity measure that is compared to a threshold value in determining whether two data segments are similar. This algorithm is used by controller 15 to measure the similarity between an EDS and the RDSs in RDS library. The similarity algorithms can be more easily understood by considering four types of algorithms. The first three types of algorithms operate on the data values themselves. The fourth type of algorithm operates on "signatures" that are derived from each data sequence.

The first type of similarity algorithm directly compares the data segments to determine their similarity. In the simplest case, the two data segments have the same length and the similarity function measures a distance between two vectors whose components are the data values. For example, if an EDS has sample values p(i) for i=1 to N, and the RDS has sample values q(i) for i=1 to N, the Euclidian distance $$D(p,q) = \sqrt{\sum_{i=1}^{N}(p(i)-q(i))^2}$$

is a measure of the degree of similarity of the two data segments. If D(p,q) is less than the threshold, T, the two segments are defined to be similar to one another, where T is a predetermined threshold value. There are many distance functions that can be used in place of the Euclidian distance for this purpose. As will be discussed in more detail below, in some applications, a particular distance function will be preferred because the computational workload in computing the function is less.

The second type of similarity function normalizes the data segments before measuring the distance between the data segments. In some applications, the shape of the data segments is more important than the exact matching of the data segments. For example, the data segments may represent two signals that differ in amplitude but have the same shape. That is, p(i)=Kq(i). If the user's goal is to look for signals having the same shape independent of the amplitudes of the signals, each data segment is first divided by a constant that depends on the average amplitude before computing the distance between the segments. In one example, the constant is the maximum value of the data segment. In another example, the constant is the average value of the absolute values of the data values in the data segment.

The third type of similarity function looks for a match between a smaller data segment and a larger data segment. This is useful in cases in which the user wants to find data segments that contain some smaller sequence. This situation arises when the data segments are of different lengths. Basically, the user wishes to look for a larger data sequence that contains a sequence that is similar to the smaller data sequence. In one example, the distance between the smaller data segment and a corresponding portion of the larger data segment is measured. If the smaller data segment is p(i) for i=1 to m, and the larger data segment is q(i) for i=1 to N, then a distance function $$D(p, q, k) = \sqrt{\sum_{i=1}^{m} (p(i+k) - q(i))^2}$$

can be defined for k=0 to (N−m−1). D is determined for the various values of k and the minimum value of D is chosen as the distance to be compared with the threshold. It should be noted that the procedure can be applied if the values of p and q can be normalized as described above. To reduce the processing time, k can be restricted to a small range. If the user has reason to believe that the two data sequences are aligned at the beginning, k can be restricted to zero.

The above similarity functions operate directly on the data segments being compared. This type of similarity function is intuitive for individuals that are not experts in clustering analysis. However, the workload to compute the similarity measures when classifying the EDSs can be large if the EDSs are large. In addition, depending on the type of similarity the user wishes to use to classify the EDSs, the fourth class of similarity function may be preferred.

In the fourth class of similarity analysis, a signature vector is derived from each data segment. The distance between the signature vectors can then be used to measure the similarity in a manner analogous to that described above. In this type of similarity measurement, the signature vectors for all of EDSs have the same components, even if the data segments differ in length. In general, the number of components in a signature vector is much smaller than the number of data values in an EDS, and hence, the computational workload of performing the distance measurements is substantially reduced; however, this savings is offset by the computational workload of deriving the components of the signature vector from the corresponding data segment. In general, a component of the signature vector can be any function of the data segment that is likely to differentiate that data segment from other data segments. In the case in which the extraction algorithm generates data segments of different lengths, one component of a signature vector could be the length of the data segment. Other components can be derived from finite impulse response filters applied to the data segment. For example, components representing the amplitude of frequency components of the data segment can be used.

The process of identifying the EDSs and updating the RDS library to account for each new EDS found is preferably carried out in real time. For the purposes of the present disclosure, a process is said to be carried out in real time if the process can be completed without reducing the rate with which the data stream enters a data logger according to the present invention. In the case of the data extraction portion of the processing, the input data stream moves through a FIFO and then out to the disk storage; hence, the extraction processing, i.e., identifying the new EDS, the controller must be able to identify the data segment that satisfies the extraction algorithm and move that data segment to a buffer in memory before part of the data segment moves out of the FIFO buffer.

The time to complete the preliminary classifications and update the RDS library depends on the amount of memory and the degree of parallel processing available. In one aspect, the new EDS is moved to EDS buffer 17 in memory and compared to the RDS in the library. The time needed to check a new EDS against the RDSs can be improved by keeping the RDSs in memory during the comparisons.

In addition, the time to find a match can be improved by performing the matching in an order that reflects the likelihood of finding a match to an existing RDS. The RDS database includes a count of the EDS matches that have already been found for that RDS. Those counts are a measure of the likelihood that the corresponding RDS will be the match to the next EDS. Hence, performing the matching in the order of the counts associated with each RDS will improve the speed of finding a match, if one exists.

If the likelihood changes over time, a separate likelihood variable that decays over time can be utilized. Each time an EDS is assigned to an RDS, the likelihood count for that RDS is incremented by one. Periodically, the likelihood counts are reduced by multiplying the counts by a decay factor that is less than one. The search for a match is carried out in an order defined by the likelihood count.

Finally, it should be noted that the matching process time can be reduced by parallel processing. The matching of the new EDS to one of the RDSs can proceed in parallel with the matching of the EDS to another of the RDSs. Hence, the matching time can be reduced by approximately a factor of M, where M is the number of parallel processors that are available. The distance computations can also be performed with the graphical processor cores in an advanced graphic display card; hence, the speed improvement through parallel processing can be a factor of more than 1000.

It should also be noted that in the matching process, the controller need only process one EDS on average in the average time needed to find and extract an EDS. If there are sufficient buffers for storing the new EDSs awaiting processing, the system need only process one EDS in the average time to find a match, not the longest time to find a match.

It is still possible that the matching of an EDS to an RDS in the RDS library fails to be completed before the buffer capacity for holding new EDSs waiting for matches is exceeded. In this case, the EDS database entry for the EDS that failed is marked as having failed to find a match, and the processing proceeds to the next EDS that is waiting to be matched, thus freeing the buffer that held the failed EDS for use by a new EDS. The failed EDSs can be processed at the end of the recording period or when buffer space becomes available do to a low rate of discovery of new EDSs during a subsequent portion of the recording period.

In one aspect of the system, the reference database is empty at the start of the data recording operation. As new extracted data segments are encountered, some of the new extracted data segments become reference data segments. For example, the first extracted data segment will become a reference data segment. The second new extracted data segment may become a new reference data segment or just be labeled as part of the cluster represented by the previously created reference data segment.

In another aspect of the invention, the user can input one or more reference data segments to be used in the comparisons. The reference segments could have been found in another data stream that was analyzed by an analogous apparatus to the present invention, created by the user, or provided by the manufacturer of the data logging apparatus.

In one aspect of the invention, the RDS database and associated RDSs that are held in memory during the recording and initial processing are available for viewing by a user during the recording to help the user understand the data stream that is being logged. In one embodiment, the user is presented with a list of RDSs ordered by count of the number of EDSs that were found to be similar to that RDS. The user can then select one or more RDSs for display.

As noted above, the RDS database includes an entry for each RDS that, among other things, lists the identification of each EDS that was found to be similar to that RDS. In one aspect, the identification is the index in the data stream at which that EDS was found. The EDS is listed here because the measure of similarity between that EDS and the RDS met some predetermined threshold condition. For example, the distance between the EDS and RDS was less than some threshold value. If the threshold condition is too loose, a large number of EDS will be associated with the RDS. More importantly, a single RDS may contain signals from two or more different clusters of signals in the input data stream. As will be explained in more detail below, such an RDS is to be avoided.

If the threshold condition is too tight, there will be many more RDSs and the size of the cluster defined by each RDS will be smaller. In principle, the smaller RDS clusters can be combined to provide a larger cluster during the post recording processes. However, having a large number of small RDS clusters during data acquisition substantially increases the computational workload associated with matching a new EDS to an RDS cluster. Accordingly, there is a tradeoff between the threshold condition and specificity of the RDS clusters.

In one aspect of the invention, the RDS database entries for each RDS also include the actual measure of similarity for each EDS associated with that RDS. A histogram of these measures is optionally provided to a user at the user's request by the controller during the recording process and during the post recording processing. By viewing the histogram, especially in cases in which a large number of EDSs are associated with an RDS, the user can gain insight with respect to the structure of the cluster. For example, if the histogram revealed multiple peaks, the cluster could contain EDSs from multiple clusters of the signals in the input data stream, and hence, require that the RDS be expanded into a plurality of new RDSs as described below.

At the end of the recording phase, the present invention will have generated two databases. The first identifies all of the data segments that satisfied the extraction algorithm. This database includes the location of each EDS in the recorded data stream and all of the RDSs that are similar to that EDS. Using this database, the controller can access any EDS that is related to any RDS. The second database identifies all of the RDSs that were generated during the recording process. The information in the RDS database identifies all of the EDSs that are related to a given RDS, the location of the EDS that started the RDS in the recorded data stream, and other information about the RDSs as discussed above.

In some cases, it may be useful to examine one or more of the IDSs. For example, if the extraction algorithm defines a fixed window relative to a trigger location, the window may be too small to capture all of the signal associated with the trigger. The idle data segment after the EDS can provide the missing portion of the truncated EDS. The index on the disk of the IDS after an EDS can be calculated from the index of the end of that EDS.

As noted above, there may be EDSs that failed classification with respect to the RDS library because the time available to make all of the comparisons was not sufficient. The EDS database tags any such EDSs. In the post recording processing, these failed EDSs can be revisited. The location of each such EDS is recorded in the EDS database. That EDS can be retrieved from the recorded data stream since its location in the data stream is known. Furthermore, the entire recorded data stream does not need to be played to reach that EDS if the recorded data stream is on a disk drive or similar random access storage device. Hence, the EDS can be retrieved and compared against the current RDS library. At this point, the EDS can be associated with one or more of the RDSs using the similarity algorithm, or if no sufficiently similar RDS is found, a new RDS can be defined for that EDS.

One of the goals of the data logging process described herein is to catalog signals that are similar to one another, and hence, allow the user to understand the various signal types in the recorded data. While each RDS represents a cluster of EDSs, the collection of RDSs does not necessarily allow the user to comprehend the clustering of the underlying set of EDSs. For example, there may be a much larger number of RDSs than there are clusters in the underlying set of EDSs. The present invention provides two tools for providing insight into the clustering of the underlying signals.

The first tool operates on the RDSs to find groups of RDSs that are part of the same underlying signal cluster. Each RDS entry in the RDS database includes an EDS which is a representative of the small group of EDSs. Hence, clustering selected ones of the RDSs allows the user to build a larger cluster of similar EDSs. Since the number of RDSs is substantially less than the number of EDSs, clustering the RDSs can be performed with a substantially smaller computational workload. To simplify the nomenclature in the following discussion, a cluster of RDSs will be referred to as a group.

Figure 2:
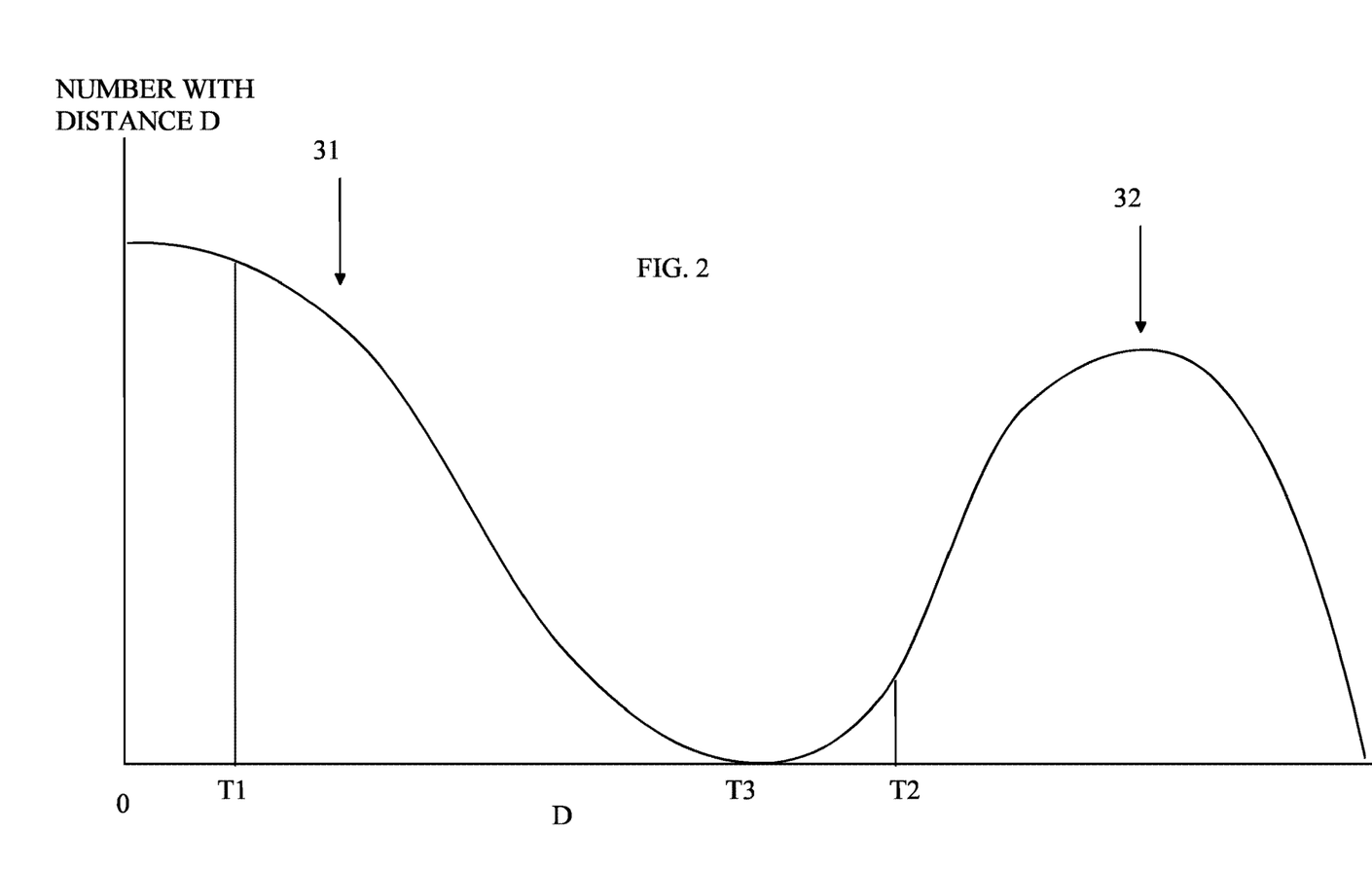
FIG. 2 illustrates an exemplary plot of the distribution of distances as a function of the distance from the RDS.

The goal of clustering the RDSs can be more easily understood with reference to a simple example. Consider an RDS that is at or near the center of a cluster of signals in the input data stream. Assume that the similarity algorithm measures the distance between two data segments. In particular, consider the distance from the EDS that forms the basis of that RDS to each of the other EDS in the EDS library. An exemplary plot of the distribution of such distances as a function of the distance from the RDS is shown in FIG. 2. In the example shown in FIG. 2, the cut off distance used to define the EDSs that correspond to this RDS is shown at T1, and the RDS only contains EDSs corresponding to a first cluster 31 of the input signals. Ideally, this RDS is to be combined with other RDSs such that the resulting group has an effective cut off distance as shown at T3.

As noted above, if the original cut off distance is too large as shown at T2, the RDS will contain EDSs corresponding to a second cluster 32 in the input signals. If such an RDS was combined with another RDS, the resulting RDS would also contain EDSs belonging to two clusters in the input signal, and hence, the resulting group would not be restricted to one cluster in the input signals. As noted above, a frequency distribution such as that shown in FIG. 2 can be helpful in identifying an RDS that is too large.

The RDSs are grouped in a manner analogous to that used to create an RDS from the EDSs. In forming the groups, a similarity relationship and a threshold are defined in a manner analogous to that described above. These definitions can be provided by a user via user interface 21 or the system itself. In the simplest case, the same similarity relationship that was used to create the RDSs is used to create the groups by altering the similarity threshold to be less selective in admitting a candidate RDS into the group. However, a different similarity relationship could be utilized.

Initially, there are no groups, and hence, the first group consists of the first RDS that is tested. In one aspect of the invention, the RDS having the highest number of EDSs is chosen to start this first group. This aspect is based on a model in which an underlying cluster in the EDSs is centered at or near one of the RDSs. Hence the RDS with the highest count is likely to be located at or near the center of such a cluster. The group is populated by examining the remaining RDSs that have not yet been assigned to a group to the group if the similarity measure for the two RDSs indicates that the two RDSs meet the similarity condition. The process is then repeated with the RDS having the maximum count that has not yet been assigned to a group. When there are no more non-assigned RDSs, the process is completed.

The user can view the data segments corresponding to the RDSs in each group in response to an appropriate command given to the data processing system. This display can be restricted to the EDS defined as the center of each RDS or to all of the EDSs that are associated with a group. These displays allow the user to determine if the signals that have been grouped using the similarity relationship do in fact appear to be similar to the user. Finally, the user can view a frequency distribution such as that shown in FIG. 2 to help determine whether the grouping process has been carried out too far.

If the number of groups is still too large, the process can be repeated using the same similarity algorithm but with a different threshold selected to be less stringent in finding similarity. In addition, the process can be repeated using a different similarity algorithm. The only restriction on the similarity algorithm is that it must be able to operate on any two EDSs. For example, a similarity algorithm that operates on EDSs of different lengths can be constructed by setting the similarity measure such that the two EDSs will be non-similar if the length of the two EDSs is not substantially the same. If the length of the two EDSs is substantially the same, then a distance function is calculated and compared to a threshold to determine whether the two EDSs are similar. In another example, the similarity algorithm could first derive a signature for each of the EDSs to be compared, and then measuring the distance between the signatures to determine if the two EDSs are similar.

The above-description assumes a particular type of clustering algorithm for re-clustering the RDSs. However, other clustering techniques could be utilized with the first tool.

As noted above, if the similarity criteria used to produce one of the RDSs is too lax, that RDS may contain a very large number of EDSs. In addition that RDS may span more than one cluster in the input signal clusters. Accordingly it is useful to replace such an RDS with a plurality of RDSs that have smaller numbers of EDSs associated with each RDS. In one aspect of the invention, an RDS can be broken into smaller RDSs by retrieving all of the EDSs associated with that RDS and re-clustering those EDSs using a similarity cut off threshold that is more restrictive. The re-clustering proceeds in a manner analogous to that described above with respect to the original clustering of the EDSs. The first new RDS is defined to include the first EDS of the group of extracted EDSs. Each successive EDS is then compared to the new RDSs. If the EDS is similar to an RDS as determined by the new cut off value, that EDS is included in that new RDS. If the EDS is not sufficiently similar to one of the new RDSs, another new RDS is defined and that EDS is used to start that RDS. When the new set of RDSs is included in the RDS library, the grouping of the RDSs can be repeated.

The clustering of the RDSs after recording is based on the extraction algorithm used in selecting the EDSs that were grouped into the RDSs. First of all, as mentioned above, each RDS may include multiple clusters. Such an RDS can be broken down to smaller clusters either by re-generating the RDS as described above, or if the computing resource allows, loading all EDSs associated with the RDS and running clustering algorithms directly on those EDSs. Alternatively, if, for example, the extraction algorithm operated by selecting all the samples within a window of fixed size position relative to a start trigger, the resulting EDSs will only approximate a data segment that includes just the signal of interest. If the window is too large, the EDS will include a significant number of background samples that can distort the distance calculation. Similarly, if the window is too small, part of the signal of interest will be cut off. As noted above, the IDS following an EDS can be accessed and the lost portion of a signal that was truncated by the fixed window can be restored. Accordingly, the EDSs are only approximations to the data signals of interest.

The second tool mentioned above allows the user to correct these approximations and hence improve the clustering. For example, if the EDS extraction algorithm was based on a fixed window, the data processing system can execute a trimming algorithm that changes the stopping location associated with an EDS from the end of the fixed window to a location consistent with the physical end of the signal of interest. For example, if the end of the EDS is a string of samples representing the background level in the data channel, the end of the EDS can be defined to be the location of the last data value that is above the background. Similarly, if the EDS was truncated by the window and there is an idle data segment adjacent to the EDS in question, then the end of the EDS can be modified to show the end of the data in the idle data segment.

After the EDSs have been updated to correct for these approximations, the new collection of EDSs can then be clustered into RDSs using the same similarity algorithm or a different similarity algorithm. The new set of RDSs can then be clustered into groups as discussed above with respect to the first tool. It should be noted that if sufficient computational resources are available, all of the EDSs corresponding to the RDS that is being re-clustered could be assembled and re-clustered as a group to provide a new set of RDSs to replace the original large RDS.

During the post recording processing using the above two tools, the user can view the actual EDSs corresponding to one or more clusters. If the EDSs within a cluster do not appear sufficiently similar to the user, the user can change both the similarity algorithm and/or the threshold value used in determining similarity. In one aspect of the invention, the user can select the similarity algorithm from a predetermined list of similarity algorithms.

In the above-described embodiments, the RDS database starts out empty and is populated as the recording proceeds. However, embodiments in which one or more RDSs are defined prior to the commencement of the recording can also be constructed. These initial RDSs allow the user to look for specific signals while still learning the contents of the data stream as the data stream is received. The reference data segments could have been found in another data stream that was analyzed by an analogous apparatus to the present invention, or created by the user.

Similarity algorithms in which the EDS and RDS are normalized prior to measuring the similarity between the two data segments can also be utilized. For example, each data segment could be divided by the maximum value of the samples in the data segment so that the comparison measures similarity in shapes. In another example, the EDS is multiplied by a constant and the similarity computed. The process can be completed for different predetermined constants, and the highest similarity measure used.

In one aspect of the invention, the processing is organized to provide as much preliminary data as possible while recording the data stream in real time. The higher levels of processing are then carried out in the background or after the data recording is completed. The processing at the time of recording a large amount of data enables extraction of a data segment that satisfies the extraction condition, preliminary classification of a similar data segment based on the extracted data segment, and detection and registration of a reference data segment while executing recording of input data, which requires a real-time operation performance. The result of the preliminary classification can first be used to execute classification by the cluster analysis for preliminarily classified reference data segments. Accordingly, the analysis processing time and response to user queries can be provided without requiring the user to wait for the data to be recovered from the long term recording device.

In other words, the processing puts the highest priority on high-speed processing, and thus does not identify an RDS with the highest similarity, but rather adopts an RDS, which is similar to an EDS with the accuracy of a predetermined threshold value, as a tag of the EDS as soon as such a RDS is found, to thereby end the processing. The processing of obtaining complete classification determination is suspended until the execution of classification of detailed data segments is performed by clustering.

The number of data segments and RDSs that are stored can be adjusted by setting the classification threshold value for similarity evaluation. As a result, it is possible to reduce the period of time for preliminary classification at the expense of mis-classifications during the preliminary processing.

As noted above, the processing time can be reduced using parallel processing as described above. In addition, by examining RDSs in an order that reflects the number of EDSs associated with each RDS, the processing time can be further reduced. In addition, the similarity evaluation function used in the preliminary classifications can be chosen to have a low computational load and then the accuracy of the clustering can be improved in later processing using a more complex similarity measure.

While the above-described embodiments use a data logger as an example, the present invention can be applied to a wide range of data signals in which an extraction algorithm can be defined together with the similarity algorithm for determining if two signals are similar.

In the above-described embodiments, the input data stream was scalar in nature. That is, it consists of a single value on each clock cycle. However, the teachings of the present invention can be applied to vector input data streams. In such a data stream, there are a plurality of input data channels in which each channel is processed by an ADC to provide an input vector on each clock cycle. The trigger circuit that defines a start of a new EDS can operate on one of the channels or more of the channels. The above-described teachings can be applied to such a vector data stream.

In the above-described embodiments, the original data stream can be recovered from the disk or other long term storage device without loss, except for any quantization errors introduced by digitizing the original analog signal. As noted above, the storage requirements for this original data stream can be in the tens of terabytes. In some applications, it is advantageous to be able to provide a compressed data stream using a lossy compression algorithm. There are two types of approximations that can be used to provide the compressed data stream. The first approximation replaces the IDSs with a count of the number of data samples in each IDS. This reduces each IDS to a code indicating that it is an IDS and the count.

The second approximation replaces each EDS by the EDS in the RDS that includes that EDS. Each RDS includes a representative EDS, and the remainder of the EDSs associated with that RDS are similar to that EDS. Hence, each EDS in the data stream is replaced by the identity of the RDS in which that EDS is located. This approximation requires, however, that the library of RDSs be included in the data stream once. However, assuming that the average number of RDSs is much smaller than the number of EDSs, the level of compression is substantial. Each representative EDS can be replaced by a compressed version of that EDS. In compressing the representative EDS, a lossless compression algorithm can be used such as Entropy encoding. Alternatively, the representative EDS can be compressed using one of the lossy data compression algorithms known in the data compression arts. It should be noted that these conventional data compression techniques may include both lossless and lossy compression algorithms.

The present invention can also be utilized as an analytical tool for understanding the signals in a prerecorded data set. In this case, the prerecorded data set is input to an apparatus analogous to that shown in FIG. 1. If the recorded data is already digital form, ADC 11 can be omitted. In such an application, controller 15 can optionally control the rate at which data is input to the system. Accordingly, when there is insufficient time to compare a new EDS to each of the RDSs before the next new EDS must be processed, controller 15 can merely stop the input of the data to allow the system to catch up.

If a compressed version of the prerecorded data is desired, the data set can be read in a second time after determining the RDSs to be used in the compressed data stream. The compressed data stream can then be output to disk 14.

As noted above, the controller of the present invention can be a conventional computer or a multi-processor. The matching of the EDSs to the RDSs is a process that can be increased in speed by utilizing a multi-processor, since the results of a match between a new EDS and one of the RDSs can be carried in parallel with a match between that EDS and another of the RDSs. The multi-processor can be a conventional multiple core computer or a graphic processing board having thousands of cores.

The present invention also includes a computer readable medium that stores instructions that cause a data processing system to execute the method of the present invention. A computer readable medium is defined to be any medium that constitutes patentable subject matter under 35 U.S.C. 101 and excludes any medium that does not constitute patentable subject matter under 35 U.S.C. 101. Examples of such media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A system for recording and analyzing a data stream, said system comprising:
    an input port adapted for receiving said data stream, said data stream comprises an ordered sequence of data values;
    an output port adapted for communicating said data stream to a mass storage device;
    a buffer connected to said input port for temporarily storing a predetermined portion of said data stream as said data stream is received by said system; and
    a controller that identifies a segment, referred to as a new extracted data segment (EDS) of said data stream stored in said buffer, said new EDS satisfying an extraction protocol and compares said new EDS to each of a plurality of reference data segments (RDSs) using a first similarity protocol, said controller storing information identifying said new EDS in an RDS database when said first similarity protocol indicates that said new EDS is similar to one of said RDSs, and said controller creating a new RDS when said new EDS is not similar to any of said RDSs, wherein each RDS comprises a list of said EDSs that were found to be similar to that RDS and said new EDS that caused said controller to create said new RDS.

2. The system of claim 1 wherein said buffer comprises a FIFO buffer.

3. The system of claim 1 wherein said extraction protocol identifies a data value in said buffer on which said new EDS begins and a data value in said buffer on which said new EDS ends.

4. The system of claim 3 wherein said data value on which said new EDS ends is a fixed number of sample values from said data value on which said new EDS began.

5. The system of claim 1 wherein said first similarity protocol computes a measure of a distance between two data segments and a similarity threshold, said two data segments being defined as being similar when said distance has a predetermined relationship with said similarity threshold.

6. The system of claim 5 wherein said controller combines two of said RDSs in response to user input when said RDSs are similar to one another as determined by a second similarity protocol that is less restrictive than said first similarity protocol.

7. The system of claim 5 wherein said controller generates a plurality of new RDSs from an existing RDS by comparing EDSs associated with that RDS with each other using a second similarity protocol that is more restrictive than said first similarity protocol.

8. The system of claim 1 wherein said controller generates a compressed data stream by replacing each EDS by a symbol representing said RDS that was found to be similar to that EDS.

9. The system of claim 8 wherein said controller replaces each sequence of data values that is not part of an EDS with a count indicating a number of symbols in said sequence.

10. A method for operating a data processing system to analyze a data stream comprising an ordered sequence of data values for clusters of said signals, said method comprising:
    sequentially receiving said data stream and assigning an index to each data value as said data value is received;
    storing a portion of said received data stream in a buffer;
    extracting a new extracted data segment (EDS) that satisfies an extraction protocol from said buffer; and
    comparing said new EDS to each of a plurality of reference data segments (RDSs) using a first similarity protocol, said data processing system storing information identifying said new EDS in an RDS database when said first similarity protocol indicates that said new EDS is similar to one of said RDSs, and said data processing system creating a new RDS when said new EDS is not similar to any of said RDSs.

11. The method of claim 10 wherein said extraction protocol identifies a data value in said buffer on which said new EDS begins and a data value in said buffer on which said new EDS ends.

12. The method of claim 11 wherein said data value on which said new EDS ends is a fixed number of sample values from said data value on which said new EDS began.

13. The system of claim 10 wherein said data processing system computes a measure of a distance between two data segments and a similarity threshold, said two data segments being defined as being similar when said distance has a predetermined relationship with said similarity threshold.

14. The method of claim 13 wherein said data processing system combines two of said RDSs in response to user input when said RDSs are similar to one another as determined by a second similarity protocol that is less restrictive than said first similarity protocol.

15. The method of claim 13 wherein said data processing system generates a plurality of new RDSs from an existing RDS by comparing EDSs associated with that RDS with each other using a second similarity protocol that is more restrictive than said first similarity protocol.

16. The method of claim 10 wherein said data processing system generates a compressed data stream by replacing each EDS by a symbol representing said RDS that was found to be similar to that EDS.

17. The method of claim 16 wherein said data processing system replaces each sequence of data values that is not part of an EDS with a count indicating a number of symbols in said sequence.

18. A computer readable memory containing instructions that cause a data processing system to execute a method to analyze a data stream comprising an ordered sequence of data values for clusters of said signals, said method comprising:
    sequentially receiving said data stream and assigning an index to each data value as said data value is received;
    storing a portion of said received data stream in a memory buffer;
    extracting a new extracted data segment (EDS) from said buffer that satisfies an extraction protocol; and
    comparing said new EDS to each of a plurality of reference data segments (RDSs) using a first similarity protocol, said data processing system storing information identifying said new EDS in an RDS database when said first similarity protocol indicates that said new EDS is similar to one of said RDSs, and data processing system creating a new RDS when said new EDS is not similar to any of said RDSs.

19. The computer readable memory of claim 18 wherein said data processing system generates a compressed data stream by replacing each EDS by a symbol representing said RDS that was found to be similar to that EDS.

20. The computer readable memory of claim 19 wherein said data processing system replaces each sequence of data values that is not part of an EDS with a count indicating a number of symbols in said sequence.

* * * * *